UNITED STATES PATENT OFFICE.

FRANCIS G. SPILSBURY, MARIE F. C. D. CORBAUX, AND ALEX. S. BYRNE, OF ENGLAND.

IMPROVEMENT IN THE MODE OF APPLYING DISTEMPER COLORS HAVING ALBUMEN OR GELATINE FOR THEIR VEHICLE, SO AS TO RENDER THE SAME MORE DURABLE, AND PRESERVING THE SAME WHEN NOT WANTED FOR IMMEDIATE USE.

Specification forming part of Letters Patent No. 1,676, dated July 10, 1840.

*To all whom it may concern:*

Be it known that we, FRANCIS GYBBON SPILSBURY, MARIE FRANCOISE CATHERINE DOETZER CORBAUX, and ALEXANDER SAMUEL BYRNE, all subjects of the Queen of Great Britain, have invented or discovered new and useful Improvements in Paints or Pigments and Vehicles, and in Modes of Applying Paints, Pigments, and Vehicles; and we do hereby declare that our invention is fully described in and by the following statement, viz:

In preparing and applying paints or pigments and vehicles as at present generally practiced for painting or coating surfaces therewith various vehicles are employed, and when it is intended that the pigments or paints should be so fixed as to allow of being cleaned by washing with soap and water the pigments employed are mixed with oil or spirit, or with oil or spirit varnishes; and it may be remarked that from the circumstance of employing the above-mentioned vehicles many of the cheaper pigments—such as earths and others—cannot be used with advantage; and pigments are also often employed mixed with gelatine or size, and known as water-colors, coloring, and distempering; but when such mode of employing pigments is resorted to, owing to the vehicle being soluble in water, the paints, when applied to surfaces, are not so fixed as to allow of washing with water or with soap and water, as practiced when cleaning paints prepared with oils, or spirits or varnishes produced therewith. Consequently, although by such means of employing soluble vehicles cheap as well as other pigments may be employed, yet, owing to these not being so fixed as to allow of cleaning, such application of paints or of pigments is not suitable for the better class of painting nor for the use of artists.

We would here remark that we are aware that it has been proposed to first coat over floors and other surfaces with pigments or paints combined with gelatine or size or with paste, and then to apply one or more coatings of drying-oils or oils mixed with varnish; but we are not aware of the same having been performed to any extent or to any considerable advantage.

We have thought it desirable thus to call attention to the means of preparing paints or pigments and vehicles, and to the modes of applying the same now known and in use, in order that the peculiar nature of our invention may be readily understood and distinguishable from previously-known means of preparing pigments or paints and vehicles, and of the means of applying them.

Now, the object of our invention, whether in preparing pigments or paints and vehicles, or in the mode of applying them, relates to means of using soluble vehicles for applying paints or pigments, which vehicles by an after application of chemical agents or reagents are rendered insoluble in water, and will thus allow of paints or pigments so applied and so fixed to be afterward washed in order to clean them, and will at the same time admit of paints or pigments and vehicles so employed being applied for the most elegant purposes of house and such like painting, and also to the purposes of the artist and for printing paper and other fabrics, and at the same time in their use they will not emit that disagreeable smell consequent on using oils, or spirits or varnishes produced therewith, combined with paints or pigments.

In painting there are few of the coloring-matters or pigments used as a single pigment, but they are used as coloring substances to what may be called a "body-pigment," and in most instances white lead (carbonate of lead) is used, when oils, or spirits, or varnishes prepared with them, are the vehicles and the colored pigments are mixed therewith in order to produce the color or tint of color desired and in the quantity desired. Hence in any mode of compounding pigments for the purposes of being applied as paint it is important to have a good and cheap white pigment, which can be obtained in large quantities, and we prefer for such purposes sulphate of lime, sulphate of barytes, argillaceous earths, or other white pigments may be used, which should be free from iron, and we compound with the white pigment the colored pigments in order to produce the color or the tint of color desired in the same manner as heretofore practiced.

The invention relating to modes of applying certain well-known chemical actions to the purposes of the art of painting, it will now be desirable shortly to explain the principles of action which are brought about in carrying out our invention, in order that the rationale of the working of our improvements may be readily understood.

It is well known that many chemical agents or reagents when brought in contact with gelatine or with albumen in solution coagulate them, and such coagulated substances, when dry, are insoluble, and such is the case with other matters hereinafter described, which, as well as gelatine and albumen, we employ as the soluble vehicles for mixing with pigments in order to their being used as paints, and by the subsequent application of chemical agents or reagents such vehicles are rendered insoluble and the paints or pigments employed fixed or set.

Having thus called attention to the general nature of the invention, we will proceed to be more particular in describing the processes of preparing paints or pigments and vehicles, and of their combination, in order to their being in a proper state to be kept prepared and allow of being transported from place to place; and we will first describe the process of preparing a white pigment in combination with gelatine, adding such preservative means as will keep the gelatine from decomposition, and thus allow of the same, when mixed and ground with pigments, to keep for a very considerable length of time.

When using gelatine as the soluble vehicle we prefer to employ alum as the fixing means, in consequence of its cheapness and being, as we believe, the best of the chemical agents which are capable of rendering gelatine insoluble in water. At the same time we do not confine ourselves thereto; and it should be stated that as most of the paints or pigments will be found to be more or less acted on by the chemical agent or reagent employed for fixing or rendering the soluble vehicle insoluble, it is important that the pigment employed should be first subjected to the action of the chemical agent to be afterward used in fixing the vehicle or paint. Thus, supposing the pigment intended to be used be an earth and the chemical agent alum, then we submit the earth to the action of alum by mixing and washing it with a cold saturated solution of alum, and subsequently by repeated washings to remove the undecomposed alum therefrom, and it will then be in a proper state to be ground up with gelatine and water in the same way as pigments or paints are usually ground. We employ small pug-mills for the purpose of mixing, and, if for immediate use, it must be reduced to the proper consistence with soft water, and will then be laid onto the surface or surfaces in like manner to ordinary paints, each coat being allowed to dry before another is laid on, and when one, two, or more coats have been applied, according to the desire or judgment of the painter or artist, and have become dry, the same is to be fixed by applying a cold saturated solution of alum or such other chemical agent as may have been determined on. By this means the paint on the surface will be fixed and insoluble in water. Thus surfaces may be painted in the most finished and elegant manner; and it is only requisite to remark that in using colored pigments they should also be first treated with the alum or chemical agent to be employed in fixing the vehicle, as above described, in order to prevent any prejudicial action taking place in respect to the color and to the pigment itself, which in many cases would be the case should such pigment be used without preparation and subsequently brought in contact with the chemical agent used to fix the paint.

It will be seen that so far as the simple compounding or mixing pigments with gelatine, when to be immediately used, in carrying out our invention, is similar to the ordinary means now resorted to in coloring or distempering; but it will be found that in order to carry out our invention in the most finished manner a much larger proportion of gelatine is required, and we shall hereinafter give such information as to the relative quantities we have found most advantageous; and our invention, so far as relates to the description above given, consists in the mode of treating the pigments employed with the chemical agent as a preparatory process before mixing the gelatine and the important process of rendering the gelatine of the mixture or compound after the same is laid on to surfaces insoluble by means of alum or other chemical agent; and we would remark that albumen may be used in place of gelatine or in conjunction therewith, and we recommend the use of albumen for the purposes of the artist where the cost will not be considered an object, yet for general purposes we recommend gelatine in consequence of the same being much less costly.

We will now describe such mixtures or compounds as we have found to answer and believe will be found to be the best preparation of paint or pigment when desired to be kept.

White paint: Take one hundred and sixty pounds of sulphate of zinc or sulphate of barytes, or white earth, well washed in order to separate all foreign matters, as is well understood, and which has been treated with the chemical agent as above explained. Mix therewith about twenty pounds of solid gelatine and about fourteen pounds of sulphate of zinc (or other suitable material to preserve the gelatine from decomposition may be used) dissolved in one hundred and sixty pounds of warm water.

The state in which we prepare this compound is that of very thick paste, which we pack in small casks; or the compound may be dried with or without sulphate of zinc or other preservative; or the dry pigment may be prepared or mixed with dry gelatine or albumen; but we prefer the semi-fluid or very thick pasty state, which is a very convenient one for transport. It should, however, be remarked that if albumen be employed sulphate of zinc is not to be used.

We would remark that we do not claim the application of sulphate of zinc or any other of the known modes for preserving animal matter from decomposition generally, the same not being new in itself, and we only employ such mode or modes when compounding pigments with gelatine, or when preparing gelatine for the purpose of being used in compounding paints and pigments in order to preserve the gelatine, that the prepared pigments and vehicles may be transported from place to place and keep good for a considerable length of time, and the use of sulphate of zinc otherwise improves the quality and increases the durability of the paint when applied.

It should be stated that the means of preserving gelatine heretofore most generally practiced in order to its keeping for some time—viz., sulphurous acid, acetic acid, and alum—are not proper for the purposes of our invention, and therefore are not to be used; but in employing preservatives to gelatine it must be done in reference to the fixing process after application to surfaces, as herein described, and we use by preference sulphate of zinc or other soluble salts of zinc, the soluble salts of magnesia, the soluble salts of lead. In case the pigment is to be tinted or colored, then the white pigment is employed to have colored pigments combined or intimately mixed therewith, in order to produce the tint of color desired, unless the colored pigments by themselves are to be employed, which is seldom the case in coloring or painting, and such colored pigments are to be first treated with a cold saturated solution of alum or other material to be afterward employed in fixing the soluble vehicle by rendering it insoluble.

It may be desirable to remark that we have found that some specimens of pigments have not required any previous preparation, while others from the same place have been prejudicially acted on when used without previous preparation or treatment by the chemical agent to be afterward used. Under these circumstances we have found it desirable, as the trouble and cost are but small, to prepare all the pigments we employ by first subjecting them to the action of alum or other material afterward to be used in fixing by rendering the vehicle employed insoluble; and we would remark that the mere rendering gelatine and albumen insoluble by alum or other known chemical means forms no part of our invention, and as the chemical agents which so act are known to chemists, and as we, in carrying out our invention, have, as before described, used alum when gelatine or albumen is used for the vehicle, and believe it to be the best for the purpose, we have not thought it necessary to enter more at large into the chemical matters which are capable of rendering gelatine and albumen insoluble, yet, as other persons may consider it desirable to employ other chemical agents, we recommend that whatever be the agent employed the pigment and vehicle should be tested by it by applying a small quantity of them to a surface, in order to ascertain whether it will retain its property of fixing, and not have any prejudicial action in respect to the pigment or vehicle when combined or to the color thereof.

Another part of our invention relates to a like mode of employing other soluble vehicles for pigments, in which the vehicles are to be afterward rendered insoluble by alum or other known chemical reagents, and this part of the invention relates to the employment of resinous matters dissolved in a solution of borax or in an alkaline lye, and this part of the invention also relates to the employment of wax dissolved in an alkaline lye. As an example of the former, we take well-bleached shellac and combine it with borax in the proportion of about five pounds of the former to one pound of the latter. These are boiled until dissolved in about four gallons of water. With this vehicle the pigments required are to be ground to the proper consistency of paint, which is to be laid on the usual way, one or more coats, as required, and when dry it is to be washed over with a solution of alum or other chemical agent which is known to destroy the combination of the lac and the borax, rendering the lac insoluble.

As an example of the second vehicle, we take a lye of caustic soda, specific gravity 1.04, to which we add an equal weight of white wax as of lye. This mixture is boiled several hours, adding half a gallon of water to every pound of wax after the solution is effected, and we prefer to add four pounds dry starch, calcined or uncalcined, to each pound of wax. To this vehicle is to be added as much of such pigments which by previous test are not acted upon prejudicially by an alkaline solution as shall bring it to the consistency of honey. Reduce this mixture to a proper state for painting by the addition of soft water—the softer the better—and when the surface painted with it is dry wash over as before with a solution of alum or other chemical agent which is known to destroy the combination of wax and an alkali, leaving the wax insoluble in water.

It is obvious that the above vehicles may be used in combination with each other as well as separately.

Another mode of employing gelatine and the other vehicles described for fixing paints or pigments is to apply a coating of either of the vehicles over a painted or printed surface and subsequently fixing the vehicles by a chemical solution, as above described. By this means paints or pigments may be set without the necessity of putting the above-mentioned vehicles in the paint or pigment before using the same.

Another form of our invention is to mix pigments with sulphate of zinc or other preservative material, as above described, but without any vehicle, directing the painter to supply the necessary gelatine. The object of this mode is to enable the mixture with gelatine, when made, to keep a reasonable time in hot weather, at the same time that not being mixed till wanted the pigments can be kept an unlimited time. This mode of preparation is particularly applicable for hot climates.

We would, in conclusion, remark that we believe the best vehicles to be employed are gelatine and albumen, and, as above stated, that the best chemical agent known for rendering the soluble vehicles herein described insoluble is alum.

It may be desirable to state that pigments and vehicles treated according to our invention are applicable in printing and painting paper and other fabrics as well as other surfaces using pigments and vehicles according to our invention in place of pursuing the means heretofore resorted to, and we have found that in using a solution of alum as the fixing material it is desirable to apply a small quantity of dissolved starch—say a hundredth part of the solution—by which the same will work better and not be liable to run when laying it on.

Another part of our invention relates to a mode of applying certain vegetable matters in the preparations and application of paints or pigments. For this part of our invention the glutinous or adhesive products of vegetable matters generally will do; but we prefer gluten, albumen, gums, mucilage. These may be used either separate or in combination with other products usually found therewith. For example, we take flour mixed with water in such proportions as to form, when boiled, a mixture about the consistency of cream. With this liquid the pigment is to be ground to the state of paint with or without sulphate of zinc or other preservative, as described in the preceding part of our specification.

This paint or pigment, if necessary, is to be reduced with water, and is to be laid on in the usual manner, and when dry may, according to our invention, be fixed by an application of a suitable chemical agent or reagent. We prefer silicate of potassa or of soda, commonly called "liquor of flint," or other chemical agent known to render such vegetable products insoluble in water, and we would remark that we dilute the liquor of flint as much as possible, so long as the liquor will have the desired effect of fixing and rendering the paint on the surfaces insoluble by water, which is readily tested by laying a small quantity of the pigment or paint prepared with a soluble vehicle intended to be used, and when dry by applying the liquor and letting the same dry for forty-eight hours, when by washing the surface it will be seen whether the strength of the liquor used has been sufficient, and if so the same strength of liquor will do for the pigment or paint and vehicle.

We will give another mode of carrying out this part of our invention with effect.

We take any quantity of dissolved tragacanth dissolved of the consistency of linseed-oil, which we mix with as strong a solution of silicate of potassa or of soda which by previous test is not found to injure the color to be employed with this mixture. The paint or pigment is to be brought to a proper consistency for working and then applied in the usual way to surfaces, and when well dried the same will allow of being washed and cleansed, owing to the paint on the surface being insoluble in water.

Having thus described the nature of our invention, and the best manner in performing the same, we would have it understood that we do not confine ourselves to the precise quantities described, as they may be varied; but we have given the best preparations, according to our present experience; and we would have it understood that

What we claim is—

1. The mode of employing paints or pigments and soluble vehicles, gelatine, and albumen by afterward rendering such paints or pigments and vehicles insoluble, as above described.

2. As a new manufacture, the combining pigments with gelatine and albumen in a dry mass or in a paste with suitable materials for preserving the latter from decomposition in order to allow of keeping the paints or pigments so prepared in order to their being transported from place to place, and only require to be rendered liquid by hot soft water for use when gelatine is employed as the vehicle, and cold soft water when albumen is employed.

3. As a new manufacture, the mode of preparing pigments with resinous matters or wax dissolved in an alkaline lye or solution of borax made into a thick paste, (or dry,) and thus to allow of the prepared pigments being transported from place to place and only requiring hot soft water to liquefy it for use.

4. The mode herein described of applying pigments, paints, and soluble vehicles, wax, or resinous matter dissolved in an alkaline lye or borax by afterward rendering such paints or pigments and vehicles insoluble, as above described.

5. The mode of combining of soluble salts of zinc, magnesia, and lead with gelatine in order to preserve the same.

6. The mode of combining of soluble salts of zinc, magnesia, and lead combined with pigments, as herein described.

7. The mode herein described of preparing and applying paints or pigments and vegetable products by rendering such paints or pigments and vehicles insoluble, as above described.

8. The combining pigments with vegetable products and preserving materials, as above described.

9. The mode of preparing pigments or paints and vegetable products with silicate of potassa or soda or other materials having the property of rendering the painted surface insoluble in water, as above described.

FRANCIS GYBBON SPILSBURY.
FANNY CORBAUX.
ALEXANDER S. BYRNE.

Witnesses:
S. CARPMAEL,
J. M. RETELIN.